United States Patent Office 3,488,350
Patented Jan. 6, 1970

3,488,350
PROCESS FOR MAKING A POLYALKOXY POLY-METHYLOLMELAMINE COMPOUND OF HIGH PURITY UTILIZING AN ACID CATIONIC EXCHANGE RESIN
Malcolm Macfarland Donaldson, Bedford Village, N.Y., assignor to American Cyanamid Company, Stamford, Conn., a corporation of Maine
No Drawing. Filed Nov. 8, 1967, Ser. No. 681,565
Int. Cl. C07d 55/32
U.S. Cl. 260—249.6               10 Claims

ABSTRACT OF THE DISCLOSURE

A process for preparing high purity polyalkyl ethers of polymethylol melamine compounds comprising reacting a polymethylol melamine with a quantity of a monohydric aliphatic alcohol having from 1 to 4 carbon atoms in the presence of an acid cation exchange resin and isolating the melamine derivative therefrom wherein the number of methylol groups in the melamine starting compound is at least three and the number of moles of the alcohol actually reacted with said polymethylol compound is at least three.

BACKGROUND OF THE INVENTION

The polyalkyl ethers of polymethylol melamines have long been known in the art as is represented by the U.S. Patent 2,197,357 among a host of others which have issued since. Many of these poly alkoxy polymethylol melamine materials are resinous in nature. It is frequently desired however to produce monomeric melamine derivatives which, although not resinous in nature are nevertheless potential resin forming materials especially when used as cross-linking agents in other resinous systems. Those prior art processes which have shown the preparation of these monomeric melamine non-resinous derivatives have resulted in the production of the monomeric material but said monomeric material has frequently been found to be contaminated with some relatively small measure of dimer and trimer and tetramer. It has been found that it is advantageous to have a monomeric melamine derivative of the class described of high purity which is devoid of all or contain substantially inconsequential quantities of dimers, trimers and tetramers.

FIELD OF INVENTION

This invention is in the field of the manufacture of monomeric melamine derivatives which are poly alkoxy polymethylol melamines in which there is used an acid cationic exchange resin.

DESCRIPTION OF THE PRIOR ART

The closest prior art to which the instant applicant is aware are the U.S. Patents 2,918,452, 2,998,410 and 2,998,411.

SUMMARY OF THE INVENTION

This invention relates to a process for preparing high purity poly alkoxy ethers of certain polymethylol melamine compounds comprising reacting a polymethylol melamine compound with a quantity of a monohydric aliphatic alcohol having 1 to 4 carbon atoms in the presence of an acid cation exchange resin and isolating the melamine derivative wherein the number of methylol groups in the polymethylol melamine starting compound is at least 3 and the number of moles of the alcohol reacted with said polymethylol compounds is at least 3.

The principal objective of the present invention is to produce polyalkyl ethers of polymethylol melamine compounds by use of an acid cation exchange resin. A further object of the present invention is to practice a process for preparing polyalkyl ethers of polymethylol melamines which produce a high yield of product and at the same time produces a substantially pure product having little or no dimers, trimers and the like. These and other objectives of the present invention will be discussed in greater detail hereinbelow.

In practicing the process of the present invention one starts with a monomeric non-resinous polymethylol melamine compound that contains at least 3 methylol groups. One may use, for instance, as the starting material trimethylol melamine, tetramethylol melamine, pentamethylol melamine, hexamethylol melamine and mixtures thereof. The methods for preparing these polymethylol melamine compounds are well known in the art and there are a plurality of alternative approaches as is shown in the the patents cited hereinabove in the description of the prior art.

The alkylated polymethylol compounds are prepared in accordance with the practice of the process of the present invention by reacting a saturated aliphatic monohydric alcohol containing from 1 to 4 carbon atoms with said polymethylol compounds in the presence of an acid cation exchange resin. Among the alcohols that may be used in the practice and process of the present invention are methanol, ethanol, n-propanol, iso-propanol, n-butanol, iso-butanol and tertiary-butanol. The amount of alcohol used to react with the polymethylol melamine compound starting material will vary depending on the degree of alkylation desired to be achieved in the polymethylol melamine compound. When trimethylol melamine is used as the starting material at least 3 moles of the monohydric alcohol are reacted to form the trialkylated trimethylol melamine compound. Similarly when the tetra-alkylated polymethylol melamine compound is desired one must start with at least the tetramethylol melamine compound or the pentamethylol melamine compound or the hexamethylol compound and react at least 4 moles of said alcohol with said polymethylol melamine compounds. When even higher degrees of alkylation are desired such as the penta-alkylated polymethylol melamine compounds and the hexa-alkylated polymethylol compounds, one must obviously start with either pentamethylol melamine or hexa-methylol melamine and generally use an excess number of moles of the selected monohydric alcohol in order to insure the desired degree of alkylation. It is more difficult generally to achieve the penta-alkylation and hexa-alkylation than it is the tetra-alkylation and tri-alkylation. Therefore, the number of moles of the monohydric alcohol used in these penta-alkylated and hexa-alkylated reactions should be significantly above 5 and 6 respectively; and in fact for the hexa-alkylation process one should use at least 6½ moles of the monohydric alcohol per mole of the hexamethylol melamine as a minimum and preferably from about 9 moles to 20 moles of the monohydric alcohol per mole of the pentamethylol melamine or hexamethylol melamine. In the instance of the hexa-alkylated hexamethylol melamine the excess alcohol used does not become a part of the melamine compound molecule but instead remains in the sphere of reaction as unreacted alcohol which can readily be removed therefrom. The theoretical considerations force one skilled in the art to conclude that pentamethylol melamine can be made to react actually with only 5 moles of the monohydric alcohol and any excess used in the system beyond that will remain unreacted alcohol. Similarly the hexamethylol melamine will actually react with 6 moles of the selected monohydric alcohol to produce the hexa-alkylated hexamethylol melamine and any alcohol beyond 6 moles will remain in the system unreacted and can be removed.

The acid cation exchange resins used in the practice of the process of the present invention are commercially available from a plurality of different sources and are generally prepared by sulfonating a polymer of styrene and divinyl benzene. These styrene polymers may be prepared by polymerizing vinyl benzene or ring substituted vinyl benzenes such as the o-, m-, p-, alkyl styrenes such as the o-, m-, p-methyl styrene, the 2,4-dimethyl styrene, the 2,4-diethyl styrene, the 2,5-dimethyl styrene and the like with divinyl benzene. These styrene monomers may be used singly or in combinations with one another to produce homopolymers or copolymers of styrenes which are then available for conversion by sulfonation to the acid cationic exchange resin. Other copolymers of styrene may also be used to prepare the acid cationic exchange resin such as copolymers of styrene and maleic anhydride or any of the substituted styrenes referred to hereinabove. Additionally, one may use to prepare the styrene polymer or copolymer any of the ring-substituted halo styrenes such as the o-, m-, p-chloro styrenes, the o-, m-, p-bromo styrenes, the 2,4-dichloro styrenes, the 2,5-dichloro styrenes and the like. These acid cationic exchange resins may be used in either a hydrated state or in a dehydrated state. When the dehydrated acid cationic exchange resins are used, the process can be carried out in substantially one step since the water of condensation produced during the alkylation of the polymethylol melamine compound is absorbed by the dehydrated acid cationic exchange resin thereby rendering it hydrated particularly if the amount of the dehydrated cationic exchange resin used is stoichiometrically calculated to absorb all of the water of condensation produced during the alkylation step. Amounts in excess of the stoichiometrically calculated amount can be used but little, however, is to be gained since the acid cationic exchange resin remaining in the ultimate product whether hydrated or dehydrated needs to be removed by filtering and washing from the final product. When the hydrated acid cationic resin is used, the amount present in the system should be that amount sufficient to accomplish the alkylation but since the hydrated cationic exchange resin cannot assimilate the water of condensation produced during the alkylation, a second step is required in order to remove the water produced; and, of course, the hydrated cationic exchange resin must also be separated from the ultimate product so as to produce a poly alkyl ether of a polymethylol melamine of comparatively high purity.

The ion exchange resins used in the present invention are available commercially in various particle sizes such as between 20–50 mesh (0.042 cm. to 0.015 cm.) and these are used primarily because of economic availability. Other mesh sizes which can be used such as from 5 mesh (0.2 cm.) up to 400 mesh (0.002 cm.). A higher mesh size, namely the smaller particle size, will increase the surface area of the cation exchange resin making more sites available for reaction and consequently result in a faster rate of reaction. The cation exchange resins are commercially available in a cross-linked density range from 1% to about 20% of divinyl benzene. A consideration of the cost, mechanical strength and resistance to oxidation makes it preferable to operate in the 8%–12% divinyl benzene range, but it is feasible to operate successfully outside of this range. The yields of the ultimate product may vary as one operates outside of this range but the increased cost of resins, with a cross-linked density greater than 12, provides no advantages so as to warrant the use of such materials.

The amount of dehydrated cation exchange resin may be varied between about 15% and 40% by weight based on the weight of the methylol melamine compound charged. Lesser amounts may also be used but unreacted methylol melamine compounds are recovered and the yields of the ether derivatives are lower. Amounts in excess of 40% may also be used successfully but no appreciable advantages are to be gained thereby. When methanol is used as the alkylating compound it is preferred to use between about 15% and 25% of the cation exchange resin based on the melamine compound starting material and when the higher alcohols like isopropanol are used the amount of the cation exchange resin may be about 30% and 40% by weight, same basis. These figures are adjusted for 100% solids although the cation exchange resin is used as those purchased when in a hydrated state it has a moisture content varying between about 40% and 70% depending on the cross-link density.

The process of the present invention is best carried out at the reflux temperature of the particular alcohol selected for the alkylation step. Temperatures lower than reflux require prolonged reaction times which should be avoided since this may have a tendency to promote poly condensation and may cut into the yields of the desired monomeric product. Nevertheless one may use a temperature as low as 25° C.

Accordingly, my invention provides for a unique mode of such synthesis which involves the use of suitable acid cation exchange material, particularly a sulfonated polystyrene acid cation exchange resin, either in a semicontinuous or continuous operation. In the event the process is to be run in a continuous operation the acid exchange resin is reconstituted by washing with a suitable base, then acid, dried and reused. The quantity of dehydrated acid cation exchange resin employed is important to the function of the present invention, and is determined by the amount of water the resin is capable of absorbing versus the amount of water liberated by the reaction. Hence, it will vary with the particular reaction. When the reaction is substantially complete, i.e., all the starting material has dissolved (after from about 2 to 3 hours normally, when reaction occurs at about 50° C.), the resin is filtered and the product isolated by evaporation. A still higher yield of hexakisalkoxymethylamine can be obtained by washing the cation exchange resin with methanolic base after the first separation and evaporating the methanol.

The newly discovered process provides an improved method for the preparation of products of proven commercial significance through an easy one step route. The invention will be further and more concretely illustrated by means of the following examples of its operation. In these examples, the quantities of materials employed are expressed in parts by weight unless otherwise designated. These examples are set forth primarily for the purpose of illustration and any specific enumeration of detail contained therein should not be interpreted as a limitation in the case except as is indicated in the appended claims.

EXAMPLE 1

Hexamethylolmelamine was prepared in the usual fashion from melamine and 37 percent formalin and the product air-dried. (Analysis showed that this material contains 7.8% water and 5.8 methylol groups per molecule.)

A sulfonated polystyrene acid cation exchange resin (Dowex 50 W–12) was prepared by dehydration in a vacuum oven for 16 hours at 80° C.

A suitable reaction vessel, equipped with stirrer, condenser, thermometer and gas sparger was charged with 70 parts of the sulfonated polystyrene acid cation exchange resin and washed with methanol. This methanol was removed through the sparger after stirring for 10 minutes at reflux.

A slurry of 153 parts of hexamethylolmelamine in 500 parts of methanol was added and heated to about 50° C. under a nitrogen atmosphere. The temperature was maintained at 45–50° C. for 2 hours and 15 minutes at which time it appeared that all the hexamethylolmelamine had dissolved. The solution was drawn off and evaporated. The yield of hexakismethoxymethylmelamine recovered after drying at 45° C. in vacuo for 3 hours was 116 parts of final product. The recovered resin was washed with 0.4 equivalent of sodium in methanol. The resin contained 0.35 acid equivalent. The resulting methanolic solution was evaporated and an additional 44.2 parts of hexakismethoxymethylmelamine was obtained. The total yield of the final product is therefore, 160 parts of a percent yield of 89%.

The melting point of the hexakismethoxymethylmelamine is 49° C. (sharp melting point). Theoretical melting point is 52° C. The material when powdered does not appear to fuse under its own weight at room temperature. It is readily soluble in water to the extent of about 10%.

EXAMPLE 2

Into a suitable reaction vessel equipped with a condenser, stirrer and thermometer there is introduced 306 parts of hexamethylol melamine, 1570 parts of iso-propanol and 200 parts of 20–50 mesh sulfonated polystyrene acid cation exchange resin in hydrated form. The mixture is stirred at reflux temperature, about 80° C., for 2–2½ hours after which time all the hexamethylol melamine has dissolved and a clear solution is obtained. The contents are filtered and the cation exchange resin washed with iso-propanol and 0.5 equivalent of sodium hydroxide is iso-propanol solution. The combined filtrates are adjusted to a pH of 7.2 by the addition of 24% caustic and concentrated at reduced pressure (29" of mercury) having the temperature of 55° C. thereby leaving 430 parts of a cloudy viscous syrup. After filtration through a thin pad of filter aid a crystal clear syrup is obtained having a Gardner-Holdt viscosity of $Z_4$–$Z_5$ at 95% solids in iso-propanol and a melamine:formaldehyde:iso-propanol molar composition of 1:5.7:4.5, respectively.

COMPARATIVE EXAMPLE 3

Into a suitable reaction vessel equipped as in Example 2 there is introduced 306 parts of air dried hexamethylol melamine, 1570 parts of iso-propanol and 42.2 parts of a 70.2% solution of nitric acid. The mixture is stirred for about 2½ hours at 47–48° C. The pH of the clear solution is adjusted to 7.3 by the addition of 25% caustic. The sodium nitrate produced separates from the solution and is filtered off. The filtrate is concentrated at reduced pressure (29" of mercury) reaching a maximum temperature of 55° C. When cooled to room temperature, the product, weighing 385 parts, is a non-flowing tacky substance whose viscosity is immeasurable by conventional techniques at 95% solids. Such behavior is indicative of extensive polymerization indicating the presence of dimers, trimers and resinous polymeric materials.

EXAMPLE 4

Into a suitable reaction vessel equipped as in Example 2 there is introduced 478 parts of trimethylol melamine, 792 parts of absolute methanol and 140 parts of air dried 20–50 mesh sulfonated polystyrene cation exchange resin in hydrated form. The contents are stirred under reflux (64° C.) for 2 hours and 10 minutes after which time the solution is filtered and the pH of the filtrate is adjusted to 8.0 by the addition of a 25% caustic solution and the excess methanol is removed at reduced pressure at 50° C. The product thus obtained, measuring 558 parts, has a Gardner-Holdt viscosity of $Z_5$ at 95% solids in methanol at 25° C. The product had a molar composition of melamine:formaldehyde:methanol of 1:3.9:2.9, respectively.

EXAMPLE 5

Into a suitable reaction vessel equipped as before there is introduced 126 parts of tertamethylol melamine, 785 parts of iso-propanol and 100 parts of 20–50 mesh sulfonated polystyrene cation exchange resin in hydrated form. After stirring for 2½ hours at 82° C. the solution becomes clear. The solution is separated from the cation exchange resin by filtration. The cation exchange resin is washed with iso-propanol and the combined filtrates are treated with a 25% solution of sodium hydroxide thus raising the pH to about 7.2. The excess solvent is removed at reduced pressure and at a temperature of about 55° C. thereby leaving 140 parts of a viscous product which is made crystal clear by filtering it through a thin pad of filter aid. The resulting product had a viscosity of $Z_6$ at 95% solids in iso-propanol on a Gardner-Holdt scale at 25° C. The product had a molar composition of melamine:formaldehyde:iso-propanol 1:3.8:3.1, respectively.

EXAMPLE 6

Into a suitable reaction vessel equipped as in Example 2 there is introduced 306 parts of hexamethylol melamine, 1150 parts of ethanol and 200 parts of a cation acid exchange resin. The ethanol and the hexamethylol melamine are reacted according to the produce described in Example 2. 430 parts of a syrup are obtained which has a Gardner-Holdt viscosity of $Z_2$ at 95% solids in ethanol at 25° C. and has a melamine:formaldehyde:ethanol molar composition of 1:5.8:5.1, respectively.

EXAMPLE 7

Example 2 is repeated in all essential details except that there is introduced 246 parts of tetramethylol melamine, 1870 parts of n-butanol and 170 parts of a cation exchange resin. The product obtained amounting to 414 parts has a Gardner-Holdt viscosity of $Z_3$–$Z_4$ at 95% solids in n-butanol at 25° C. and a melamine:formaldehyde:butanol molar composition of 1:3.8:3.1, respectively.

I claim:

1. A process for preparing high purity polyalkyl ethers of polymethylol melamine compounds comprising reacting a polymethylol melamine with a quantity of a monohydric aliphatic alcohol having from 1 to 4 carbon atoms in the presence of an acid cation exchange resin and isolating the melamine derivative therefrom wherein the number of methylol groups in the melamine starting compound is at least three and the number of moles of the alcohol actually reacted with said polymethylol compound is at least three.

2. The process according to claim 1 in which the polymethylol melamine is hexamethylol melamine.

3. The process according to claim 2 in which the alcohol is methanol.

4. The process according to claim 2 in which the alcohol is iso-propanol.

5. The process according to claim 3 in which there are six moles of methanol actually reacted with the hexamethylol melamine.

6. The process according to claim 1 in which the ion exchange resin is a sulfonated polystyrene acid cation exchange resin.

7. The process according to claim 2 in which the ion exchange resin is a sulfonated polystyrene acid cation exchange resin.

8. The process according to claim 3 in which the ion exchange resin is a sulfonated polystyrene acid cation exchange resin.

9. The process according to claim 4 in which the ion exchange resin is a sulfonated polystyrene acid cation exchange resin.

10. The process according to claim 5 in which the ion exchange resin is a sulfonated polystyrene acid cation exchange resin.

References Cited

UNITED STATES PATENTS

| 2,781,332 | 2/1957 | Swann et al. | 260—249.6 XR |
| 2,918,452 | 12/1959 | Kun et al. | 260—249.6 XR |
| 2,998,411 | 8/1961 | Housekeeper | 260—249.6 XR |

HENRY R. JILES, Primary Examiner

J. M. FORD, Assistant Examiner

UNITED STATES PATENT OFFICE
CERTIFICATE OF CORRECTION

Patent No. 3,488,350 January 6, 1970

Malcolm Macfarland Donaldson

It is certified that error appears in the above identified
patent and that said Letters Patent are hereby corrected as
shown below:

Column 4, line 36, "hexakisalkoxymethylamine" should read --
hexakisalkoxymethylmelamine --. Column 5, line 3, "parts of"
should read -- parts or --; line 24, "is" should read -- in --;
line 69, "tertamethylol" should read -- tetramethylol --; Column
line 16, "pröduce" should read -- procedure --.

Signed and sealed this 10th day of November 1970.

(SEAL)
Attest:

Edward M. Fletcher, Jr.            WILLIAM E. SCHUYLER, JR.
Attesting Officer                    Commissioner of Patents